Feb. 24, 1959

N. E. HANDEL 2,875,404

PHASE DETECTOR

Filed Sept. 19, 1957

INVENTOR
NEIL E. HANDEL

By Anthony D. Cennamo

Feb. 24, 1959 N. E. HANDEL 2,875,404
PHASE DETECTOR
Filed Sept. 19, 1957 2 Sheets-Sheet 2
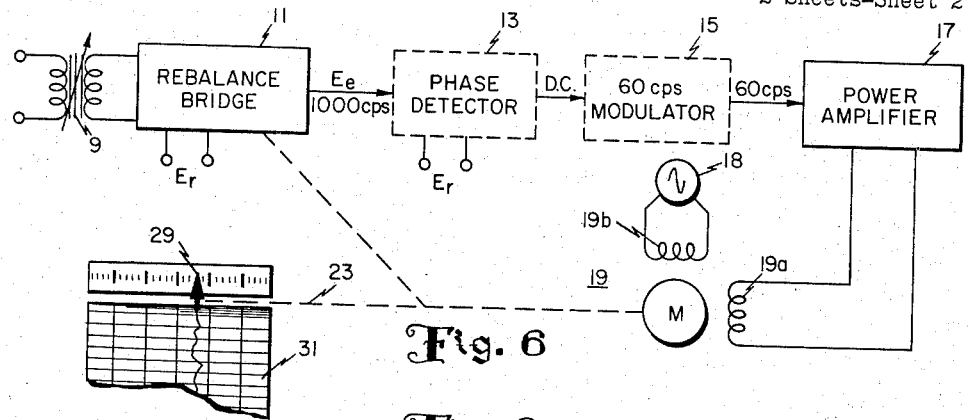
Fig. 6
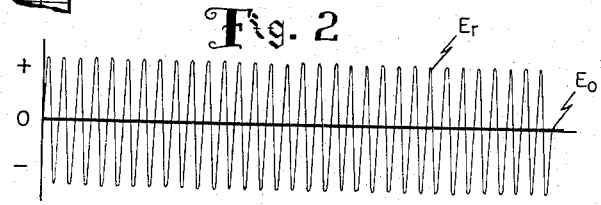
Fig. 2
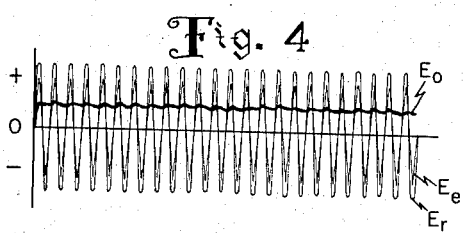
Fig. 4
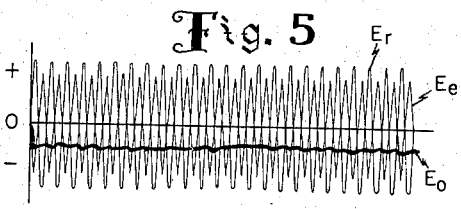
Fig. 5
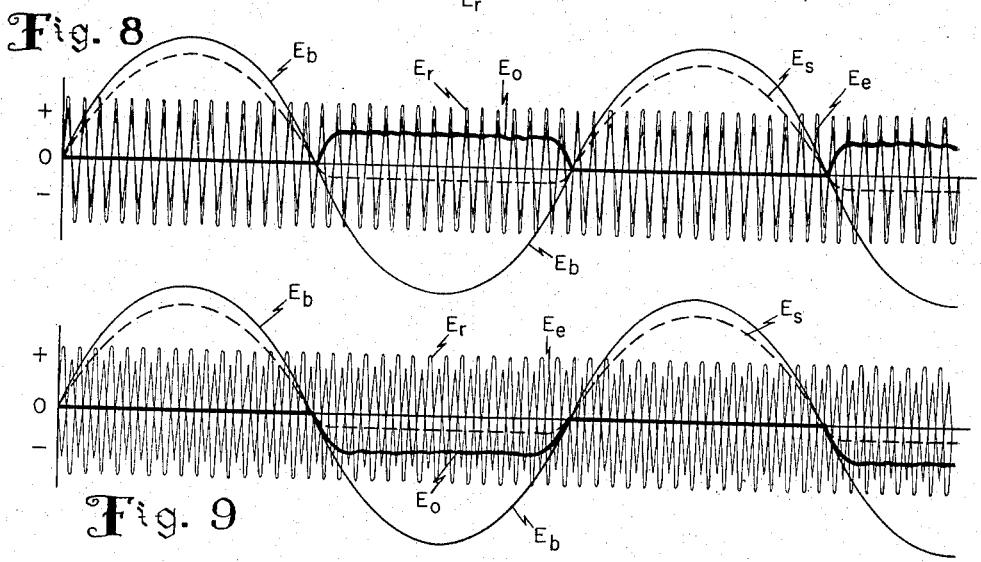
Fig. 8
Fig. 9
INVENTOR
NEIL E. HANDEL
By Anthony D. Cennamo

United States Patent Office 2,875,404
Patented Feb. 24, 1959

2,875,404

PHASE DETECTOR

Neil E. Handel, Columbus, Ohio, assignor to Industrial Nucleonics Corporation, a corporation of Ohio Application September 19, 1957, Serial No. 684,951

8 Claims. (Cl. 324—87)

This invention relates to phase detector circuits, and more specifically to phase detector circuits associated with electronic amplifiers of industrial process measuring and control systems.

In modern industrial applications, chart recorders are utilized for graphic presentation of continuous thickness measurement in processes involving moving material. Recorders are likewise used to register electrical output signals obtained from resistance thermometers, strain gauges, pressure cells and differential transformers, as well as various other types of transducers. Such transducers often operate on a carrier signal of a relatively high frequency to produce an output signal of the same frequency but varying in amplitude as the measured quantity changes. However, the transducer's output signal must eventually be converted to an A. C. signal of a relative low frequency, since a signal much lower in frequency is generally required to operate the pen motor in the chart recorder.

Conventionally, the output of the transducer is compared with a reference signal in a series bridge network whose output reverses phase as the bridge goes through balance. The bridge network is followed by a phase detector circuit to detect this change in phase. The output of the phase detector is applied to a low frequency modulator such as a "chopper" to convert the D. C. output of the phase detector to a low frequency A. C. voltage. The A. C. output of the "chopper" must be amplified to a power level sufficient to operate a utilization device; for example, to provide the motor torque needed for proper operation of the chart recorder's pen drive mechanism.

The present invention is a phase detecting circuit designed to produce an A. C. output signal of relatively low frequency as compared to that of the input signal. This output signal varies in amplitude and phase in synchronism with the amplitude and phase variations of the input signal. By the use of this circuit the conventional phase detector and chopping circuit are eliminated resulting in circuit simplification by the use of fewer components at a smaller cost.

Accordingly, it is a primary object of this invention to provide a means for modulating the phase detector output at a low rate in comparison to the frequency of the input signal, without using an external modulator.

It is another object of this invention to provide a phase detector having as an output, a low frequency A. C. signal, reversible in phase, with a minimum number of components and through the utilization of a simplified circuit design.

It is a further object of this invention to provide a circuit more stable and less likely to drift in operating level than similar devices used heretofore.

It is still another object of this invention to provide such a circuit having linear amplitude response.

Other objects of the invention will be more apparent from the following detailed description when taken in conjunction with the accompanying drawings in which:

Fig. 1 is a schematic circuit diagram of a basic discriminator circuit illustrated for purposes of understanding the present invention.

Fig. 2 graphically illustrates the relationship of the input and output voltages present in the circuit of Fig. 1.

Fig. 4 is a graph of the various voltages of the circuit of Fig. 3 when the input voltage is applied in phase with the reference voltage.

Figure 3:
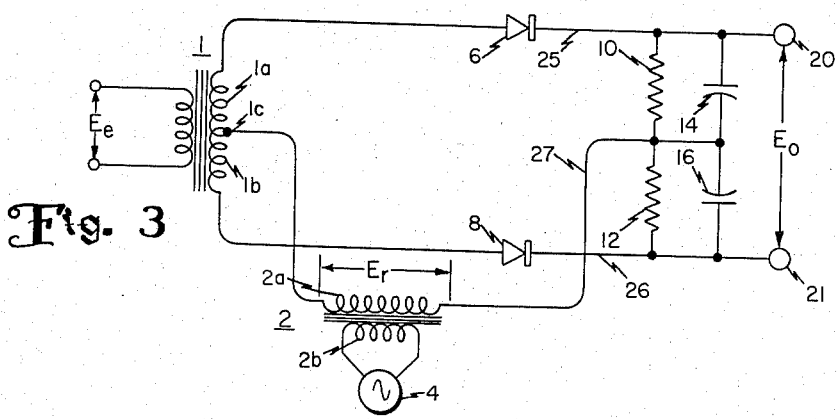
Fig. 3 is a schematic circuit diagram of the basic phase discriminator of Fig. 1 with an input voltage applied.

Fig. 5 graphically shows the voltage relationships when the input voltage applied to the circuit of Fig. 3 is 180° out of phase with the reference voltage.

Fig. 6 is a block diagram of a typical self-balancing potentiometer system illustrating how the design of the system can be simplified by use of the present invention.

Figure 7:
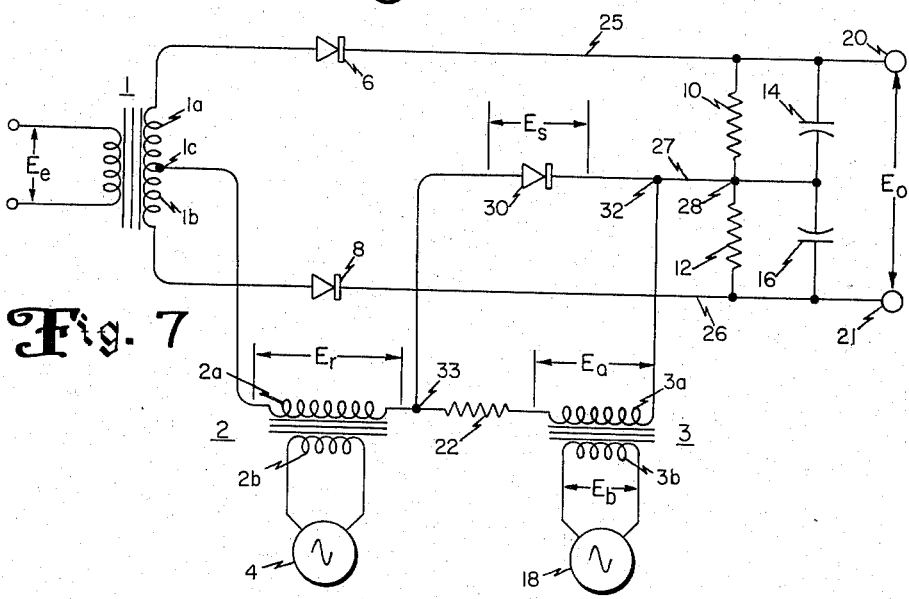

Fig. 7 is a schematic circuit diagram of a diode switched phase detector in accordance with the principles of this invention.

Fig. 8 illustrates the relationship of the various voltages in the circuit of Fig. 6 when the input voltage is applied in phase with the reference voltage.

Fig. 9 is a graphic illustration depicting the voltages involved in the circuit of Fig. 6 when the input voltage is applied 180° out of phase with the reference voltage.

Figure 1:
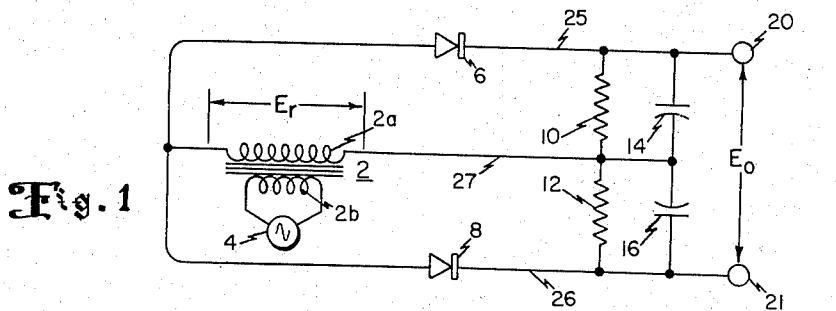

Referring to the drawings and more specifically to Fig. 1, a simple basic discriminator circuit is shown. An A. C. voltage device such as a transformer 2 in line 27 is employed to place an A. C. voltage on two unilateral phase sensing diodes 6 and 8 in lines 25 and 26 respectively. Each of the diodes 6 and 8 is connected to a load resistor 10 and 12 respectively. Capacitors 14 and 16 are connected in parallel relationship to resistors 10 and 12 and the output terminals 20 and 21.

In the operation of this circuit, an alternating reference voltage $E_r$, constant in frequency and amplitude, is applied to the circuit through the secondary winding $2a$ by an A. C. signal source 4 connected to the primary winding $2b$ of the coupling transformer 2. If the load resistors 10 and 12 as well as the phase sensing diodes 6 and 8 are electrically identical the same amount of current will flow through resistor 10 as through resistor 12 during one-half of each cycle of the reference voltage $E_r$. The phase sensing diodes 6 and 8, being oppositely polarized, prevent current flow during the alternate one-half cycle of the reference voltage $E_r$. Equal and opposite voltage drops are thereby established across each resistor, resulting in a zero output voltage $E_0$ being developed across the output terminals 20 and 21. Hereinafter $E_0$ will be understood as the potential difference between output terminals 20 and 21 with respect to terminal 21. The circuit arrangement of Fig. 1 is a fundamental circuit and is described for purposes of establishing a basis for the present invention as hereinafter described.

The instantaneous values of the A. C. reference voltage $E_r$ and the D. C. output voltage $E_0$ of Fig. 1 are shown in Fig. 2. $E_0$ is illustrated as substantially a zero voltage.

It is often necessary to detect a change in phase of one A. C. signal with respect to a reference signal and a method commonly employed is that of comparing the input signal with a reference signal in a phase detector circuit. The phase detector output is a D. C. voltage whose amplitude and polarity depends on the angle of phase difference between the input and reference signals.

Fig. 3 shows a circuit whose function as a phase detector is to compare, in phase, the input voltage $E_e$ with a reference voltage $E_r$ of the same frequency and produce an output voltage whose amplitude is dependent on the phase difference of the compared signals. In Fig. 3, the input signal $E_e$ is added to the circuit of Fig. 1 by means of a coupling device such as transformer 1. The center-tapped secondary winding of transformer 1 composed of sections 1a and 1b has its extreme ends respectively connected to the unilateral devices 6 and 8 and its center tap 1c connected to the secondary 2a of transformer 2.

The transformers 1 and 2 are so connected that the amplitude of the voltage across the secondary winding section 1a of transformer 1 and the amplitude of the reference voltage $E_r$ across the secondary 2a are series aiding when $E_e$ is in phase with $E_r$. Similarly, under this condition, the amplitude of the voltage across the secondary winding section 1b of transformer 1 and the amplitude of the reference voltage $E_r$ across the secondary 2a are serially opposing when $E_e$ is in phase with $E_r$.

When the input voltage $E_e$ and its reference voltage $E_r$ are in phase, their instantaneous values will simultaneously increase in a positive direction. A current will circulate around the loop, composed of diode 6, load resistor 10, and the secondary windings 2a and 1a (hereinafter referred to as the upper loop) due to the additive induced voltages present. The current flow around the loop composed of diode 8, load resistor 12 and the secondary windings 2a and 1b (hereinafter referred to as the lower loop), will be substantially zero since $E_r$ is opposed by the voltage across secondary winding section 1b. The current through resistor 10 results in a positive output voltage $E_0$ being developed across the output terminals 20 and 21.

During each cycle, as the instantaneous amplitudes of $E_e$ and $E_r$ reach zero potential and increase in the negative direction, no current will flow in the upper loop because diode 6 is oppositely polarized as to prevent current flow. No current will circulate aroung the lower loop since the voltage across secondary winding section 1b is opposed by the reference voltage $E_r$. The current through load resistors 10 and 12 is substantially zero.

In effect then, on the positive half-cycle of $E_e$ and $E_r$, a positive voltage $E_0$ is produced across the output terminals 20 and 21. Since the capacitor 14 tends to hold the output voltage constant, $E_0$ will simply decline from its maximum positive value to somewhat smaller positive value during the negative half-cycle of $E_e$ and $E_r$ depending on the time constant involved. The circuit of Fig. 3, therefore provides a half-wave rectification of the input signal producing a fluctuating D. C. output voltage $E_0$ as shown in Fig. 4.

In Fig. 4, the output voltage $E_0$ is plotted as fluctuating in a positive direction above the zero reference line when $E_e$ and $E_r$ are in phase. For purposes of better illustrating the relationship of the voltages in the phase discriminator circuit of Fig. 3, the input voltage $E_e$ is shown smaller in amplitude than $E_r$ the reference voltage. Fig. 4 also shows that the positive value of $E_0$ is maximum during the positive half-cycles of $E_e$ and falls off only slightly during the negative half-cycles of $E_e$ because of the charge retained by capacitor 14.

Analysis of the functioning of the circuit of Fig. 3 may be obtained by observing the changes in output voltage when the input signal's phase relationship with respect to the reference voltage $E_r$ increases from 0° to 180°. As the phase difference angle between $E_e$ and $E_r$ increases from 0°, a vector component of $E_r$ will immediately begin to aid the voltage across the secondary winding section 1b. At the same time, $E_r$ will gradually oppose the voltage produced by the secondary winding section 1a. This means that lesser amounts of current will circulate around the upper loop and more current will flow around the lower loop during each cycle of the input voltage $E_e$. Thus, $E_0$ will become less positive until a phase difference of 90° is reached, at which time the currents around both loops will be equal. With a 90° phase difference between $E_e$ and $E_r$, the phase discriminator of Fig. 3 will develop no output voltage because the currents through the load resistors 10 and 12 are equal and opposite.

Similarly, as the phase difference between $E_e$ and $E_r$ increases further from 90°, the voltages induced in the upper loop by secondary windings 2a and 1a will become series opposing while the voltages in the lower loop will become serially aiding. During one-half of the input cycle of $E_e$, when the phase difference of $E_e$ from $E_r$ is 180°, all the current will now flow through the lower loop owing to the additive induced voltages present in that loop. The opposing A. C. voltages in the upper loop prevent current flow around this loop when there is a 180° phase difference between $E_e$ and $E_r$. During the alternate half-cycle of input voltage $E_e$, effectively no current flows around the upper loop since diode 6 opposes current flow in the direction urged by $E_r$. Thus for each complete cycle of input voltage $E_e$, there is developed across load resistor 12 a negative voltage. The voltage $E_0$ measured across load resistors 20 and 21 will be at a maximum, negatively when $E_e$ and $E_r$ are 180° out of phase with each other. Capacitor 16 tends to maintain the negative voltage produced during each half-cycle, for the duration of each succeeding half-cycle, when no current flows through the load resistors 10 and 12.

Referring now to Fig. 5, there is graphically illustrated the input voltage $E_e$, shifted in phase by 180° from the reference voltage $E_r$, in relation to the instantaneous values of $E_0$ which fall below the zero reference line as negative quantities. The relation of $E_0$, in amplitude and time, to $E_e$ and $E_r$ is best shown in Fig. 5 wherein $E_0$ is effectively a maximum negative D. C. voltage when $E_e$ and $E_r$ are 180° out of phase.

Measuring devices of many types are presently employed as the sensing element in recording systems in certain industrial fields which are concerned with thickness measurement of sheet material. The differential transformer is often used as the sensing or detecting element in such a system and essentially consists of two separate coils wound on a metallic core. The differential transformer may be used in a system designed to record variations in thickness of moving sheet material as might be found in a rolling steel mill. In such an installation, the differential transformer is positioned near the sheet material so that thickness variations of the steel may change the permeability of the transformer's flux path.

If an A. C. voltage is impressed on the primary winding, it follows that an A. C. voltage will be induced in the secondary winding since they are inductively coupled. Now, if an increase in steel thickness occurs, the permeability of the flux path is increased and the lines of flux produced by the first winding will be augmented. More lines of flux will cut the secondary winding causing an increase in the amount of voltage induced. The differential transformer is commonly adapted to modulate a carrier signal of 1000 cycles per second applied to its primary winding to produce an output signal of the same frequency but of a different amplitude according to the quantity of material detected. This output signal is then fed to a rebalancing bridge network in a typical recording system.

Referring to Fig. 6, a block diagram is shown of a recording system utilizing a servo-motor 19 to balance a slidewire rebalancing bridge 11. The slidewire is a variable resistance element mechanically driven in this instance by a 60 cycle, two phase motor 19 whose purpose is to adjust the slidewire so that the rebalance bridge 11 may be continuously rebalanced regardless of a changing input signal. The motor 19 may be mechanically linked at 23 to a recorder assembly so as to drive a tracing pen 29 back and forth across a continuous moving chart 31. The differential transformer 9 is followed by the rebalance bridge 11 which in turn is followed by a phase detector 13 such as the type illustrated in Fig. 3 and a 60 cycle modulator 15. A 60 cycle power amplifier 17 and a 60 cycle voltage source 18 serve to energize the two windings 19a and 19b of servo-motor 19.

In the operation of the system, as a change in output signal of the differential transformer 9 is applied to the rebalance bridge 11 where it is compared to a reference voltage $E_r$ of the same frequency, the balance point of the bridge 11 is upset and an output signal $E_e$ of 1000 cycles is developed by the rebalance bridge. The bridge output $E_e$ will be either in phase or 180° out of phase with the reference voltage $E_r$ depending on the direction in which the bridge is unbalanced.

The bridge output $E_e$ is next compared to $E_r$ in a phase detector 13 and a D. C. output voltage is obtained as heretofore explained in Fig. 3. As a low frequency voltage is required to operate the servo-motor 19, the D. C. output of the phase detector must be modulated at a low frequency rate by a conventional chopping circuit designated generally by the reference numeral 15. This chopping is usually performed at a 60 cycle rate since servo-motors are quite often operated at this frequency. A power amplifier 17 supplies the servo-motor 19 with sufficient low frequency power to operate. This method of converting from a 1000 cycle signal to a 60 cycle signal is disadvantageous because of the external modulating circuit and associated components required.

The polarity of the D. C. output of the phase detector 13 determines whether or not the 60 cycle applied to one winding 19a of the two-phase motor 19 is in phase or 180° out of phase with the power line voltage applied to the other motor winding 19b by the alternating voltage source 18. The servo-motor 19 is so connected as to move the slidewire in the direction necessary to balance the bridge 11. The tracing pen 29 will simultaneously record on the chart 31 the variations in measured material as detected by the differential transformer 9.

With reference now to Fig. 7, a diode switched phase detector in accordance with the principles of the present invention provides a low frequency signal output without the need of an external modulator. The present invention will therefore replace both the phase detector 13 and modulator 15 of Fig. 6 resulting in a substantial savings in circuitry and components. The present invention produces a low frequency A. C. output signal the phase of which reverses whenever there is a phase reversal of the high frequency input signal $E_e$ in relation to its reference signal $E_r$. Generally, this may be accomplished in a typical embodiment by switching the action of a phase detector on and off at a repetition rate equal to 60 times a second.

This on and off switching of the phase detector is accomplished by inserting a pulsating voltage $E_s$, hereinafter called the switching voltage, in series with the reference voltage $E_r$ in the common arm of the upper and lower loops, i. e., the line between points 1c of transformer 1 and the common point 28 of load resistors 10 and 12. The switching voltage $E_s$ occurs across a unilateral device such as a diode 30 hereinafter called the clamping diode as distinguished from the phase sensing diodes 6 and 8. The anode of the clamping diode 30 is connected to the end of the secondary winding 2a while its cathode is connected by means of line 27 to the common point 28 of load resistors 10 and 12. The clamping diode 30 is likewise connected in a series loop comprising a limiting resistor 22, and an A. C. voltage source like the secondary 3a of a coupling device shown by a transformer 3. The junction point 32 of the cathode of clamping diode 30 and the secondary winding 3a is connected by means of line 27 to the common point 28 of resistors 10 and 12. The junction point 33 of the anode of the clamping diode 30 and resistor 22 is connected to one end of the secondary winding 2a. The primary 3b of transformer 3 is connected to a 60 cycle voltage source 18. The clamping diode 30 and series resistor 22 are added to minimize the chance of introducing unbalance voltages in the output caused by mismatches in diodes 6 and 8 as well as load resistors 10 and 12.

In the operation of the circuit of Fig. 7, a 60 cycle A. C. voltage $E_a$ is developed across the secondary winding 3a when the primary winding 3b is connected to an alternating 60 cycle voltage source 18. It is understood that the voltage source 18 may be of another frequency in dependence upon the particular application required and that the present operation at 60 cycles is only illustrative of a typical embodiment.

In order to bias the phase sensing diodes 6 and 8 beyond cutoff, $E_a$ must be larger than the sum of the reference and signal voltages. During one half of each cycle of $E_b$, the clamping diode 30 will not conduct current through resistor 22 and the entire secondary voltage $E_a$ will appear across clamping diode 30 as $E_s$. $E_a$ also appears as a large cut-off bias across the phase sensing diodes 6 and 8 and since no rectification of input signal $E_e$ can occur, the D. C. output voltage $E_0$ drops rapidly to zero during this half-cycle of 60 cycle input voltage $E_b$. Conversely, during the alternate half-cycle of $E_b$, the clamping diode 30 will conduct heavily through resistor 22, thereby making $E_s$, the voltage across it negligibly small in comparison to its value during the previous half-cycle of $E_b$. Since $E_s$ is now tending toward zero, the cut-off bias on the phase sensing diodes 6 and 8 is removed and clamping diode 30 appears as a low series resistance to the flow of signal current from the common return point 28 to the center tap 1c of transformer 1. The circuit of Fig. 7 thereby functions as a conventional phase detector during alternate half-cycles of $E_b$, charging the filter capacitors 14 and 16 to a polarity corresponding to the phase relationship of the input signal. Since the output signal $E_0$ and the input signal $E_e$ are of dissimilar frequencies the phase of $E_0$ must be referred to another signal of like frequency. Hence, the resulting 60 cycle output signal changes phase with respect to its reference, the line voltage $E_b$, whenever the input signal $E_e$ changes phase with respect to its reference signal $E_r$.

With reference to Fig. 8, if $E_e$ is applied in phase with $E_r$ to the diode switched phase detector of Fig. 7, $E_0$ will increase in a positive direction and then fall to zero in pulses at a rate determined by the frequency of the applied A. C. voltage $E_b$. $E_s$ is shown as a voltage larger in amplitude than the sum of $E_e$ and $E_r$ during the positive half-cycle of $E_b$ so that the phase sensing diodes 6 and 8 are cut off and the amplitude of $E_0$ is zero. It is likewise shown in Fig. 8, that, as $E_s$ goes through zero in the alternate half-cycle of $E_b$, the phase sensing diodes 6 and 8 conduct and produce a positive output voltage $E_0$.

Referring to Fig. 9 when the input voltage $E_e$ shifts in phase by 180° from the reference voltage $E_r$, the output voltage $E_0$ of Fig. 7 is plotted as a signal voltage pulsating in the negative direction. $E_0$ is now shown as a negative quantity when $E_s$ tends toward zero below the zero reference line. Since $E_s$ drops below zero 60 times a second, the amplitude of $E_0$ will pulsate in the negative direction at the same rate if $E_e$ is 180° out of phase with $E_r$. It is apparent that if diode 30 and resistor 22 were not employed in the circuit of Fig. 7 the switching voltage $E_s$ would effectively be equivalent to the secondary voltage $E_a$.

Since $E_e$ is of a much higher frequency than $E_a$, by choosing a certain value of capacitance in capacitors 14 and 16, a filter time constant low enough to prevent 60 cycle phase shift is attained while at the same time removing the higher frequency components of the input signals $E_e$ and $E_r$. The diode switched phase detector of Fig. 7, thus produces a 60 cycle per second output voltage $E_0$ whose phase depends on the phase difference between $E_e$ and the reference voltage $E_r$.

While I have described above the principles of my invention in connection with specific apparatus, it is to be clearly understood that this description is made only by way of example and not as a limitation to the scope of this invention as set forth in the objects thereof and in the accompanying claims.

What is claimed is:

1. A phase detector comprising a first and second loop circuit, each loop including at least a unidirectional element, a load resistor and an arm common to both of said loops, means for applying to each of said two loops an alternating input voltage, means serially connecting in said common arm a reference voltage of the same frequency as said input voltage to provide across said load resistors a direct current voltage of an amplitude proportional to the amplitude of said input voltage and of a polarity changing relative to the reversal in phase occurring in said input voltage; modulating circuit means also serially connected in said common arm of said two loops, said circuit means operative to modulate said direct current voltage across said load resistors to provide an output voltage of a frequency of said modulating means and reversing in phase from a reference relative to the reversal in phase of the said input voltage.

2. A phase detector comprising a first, second and third inductive device each having a primary and secondary winding; a first closed loop circuit comprising a portion of the secondary winding of said first inductive device, a first unidirectional element, a first load resistor and said secondary windings of said second and third inductive devices; a second closed loop circuit comprising the remaining portion of said secondary winding of said first inductive device, a second unidirectional element, a second load resistor, and said secondary windings of said second and third inductive devices in common with said first closed loop circuit; means to couple an input voltage to the primary winding of said first inductive device, means to couple to the primary winding of said second inductive device a reference voltage of the same frequency as said input voltage to provide across said first and second load resistors in said first and second closed loop circuits a direct current voltage of an amplitude proportional to the amplitude of said input voltage and of a polarity changing relative to the reversal in phase occurring in said input voltage; modulating circuit means coupling to the primary winding of said third inductive device a modulating voltage of a lesser frequency than said input and reference voltages to provide an induced modulating voltage across said secondary winding of said third inductive device for modulating said direct current voltage across said load resistors whereby there is produced an output voltage of a frequency of said modulating voltage and reversing in phase relative to the reversal in phase of said input voltage.

3. A circuit substantially as set forth in claim 2 wherein said last named means comprises said secondary winding of said third inductive device, a third resistive element and a third unidirectional device serially connected in a closed circuit loop.

4. A circuit substantially as set forth in claim 2 wherein said last named means comprises said secondary winding of said third inductive device, a third resistive element and a third unidirectional device serially connected in a closed loop circuit, said third unidirectional device comprising an anode and a cathode and means connecting said cathode to a common junction of said first and second load resistors and one end of said secondary winding of said third inductive device; means connecting said anode to the common junction of said secondary winding of said second inductive device and one end of said third resistive element; and means connecting the other end of said third resistive element to the alternate end of said secondary winding of said third inductive device.

5. A circuit substantially as set forth in claim 2 wherein said induced modulating voltage across said secondary winding of said third inductive device is larger in amplitude than the sum of the induced input and reference voltages.

6. A circuit substantially as set forth in claim 2 wherein said last named means provides a means whereby signal currents are conducted through said first and second unidirectional devices for one-half cycle of said modulating voltage and a means whereby the flow of said signal currents through said first and second unidirectional devices is restricted for the alternate half-cycle of said modulating voltage.

7. A circuit substantially as set forth in claim 2 wherein said first and second closed loop circuits further comprises a capacitive element in parallel relationship to said first and second load resistor respectively.

8. A circuit substantially as set forth in claim 2 wherein there is included a means for substantially eliminating high frequency components of said input and reference voltages in said output voltage and allowing said modulating frequency components to be unimpeded in said output voltage.

References Cited in the file of this patent

UNITED STATES PATENTS

| | | |
|---|---|---|
| 2,577,668 | Wilmotte | Dec. 4, 1951 |
| 2,617,858 | Brink | Nov. 11, 1952 |